United States Patent Office 3,459,562
Patented Aug. 5, 1969

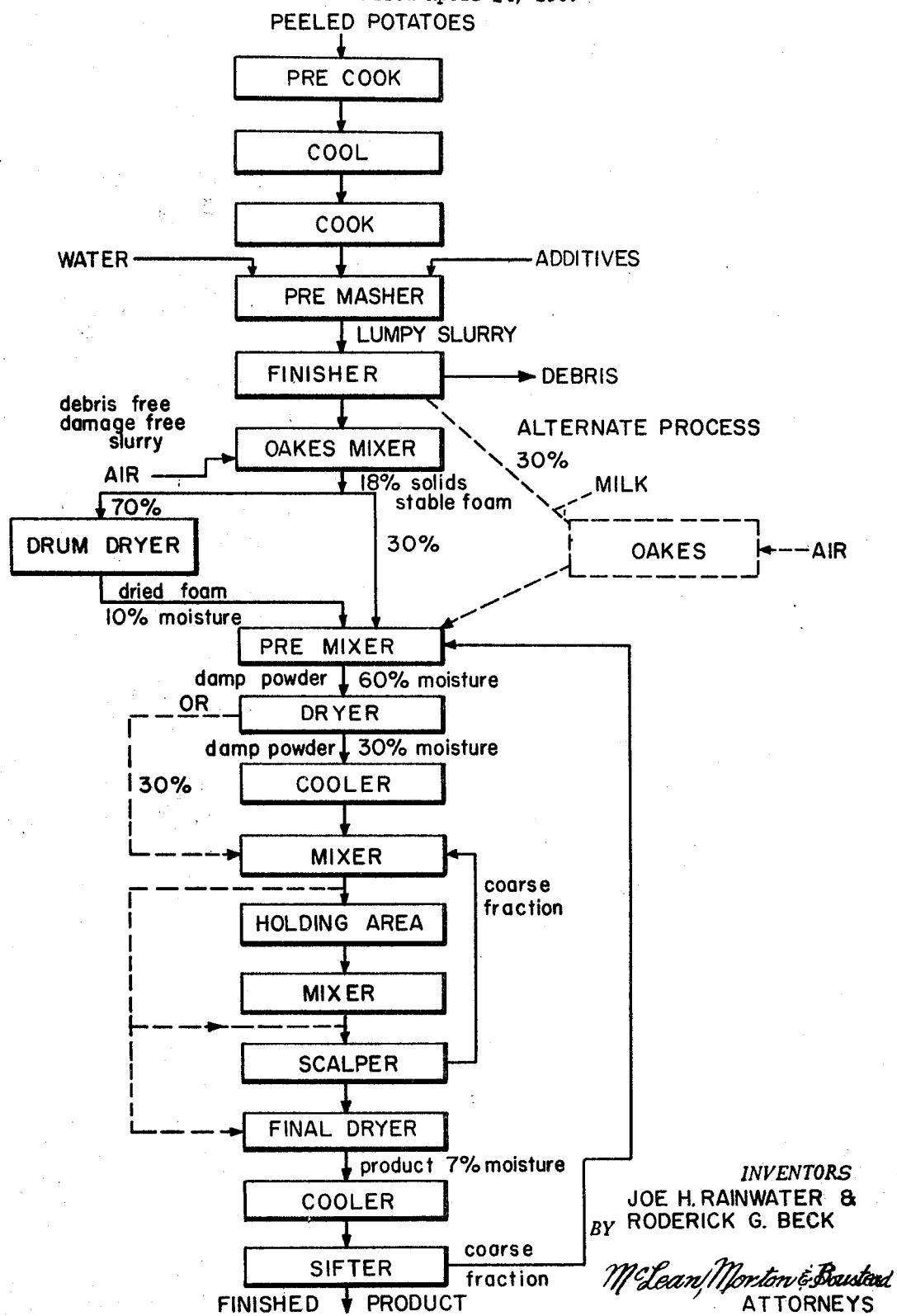

3,459,562
PROCESS FOR PRODUCTION OF INSTANT MASHED POTATO PRODUCTS OF VARIED BULK DENSITIES FROM A FOAMED SLURRY OF COOKED POTATO SOLIDS
Roderick G. Beck and Joe H. Rainwater, Blackfoot, Idaho, assignors to American Potato Company
Filed Apr. 14, 1966, Ser. No. 542,597
Int. Cl. A23l 1/12
U.S. Cl. 99—207    4 Claims

ABSTRACT OF THE DISCLOSURE

Roughly peeled potatoes are conventionally precooked, cooled, cooked, and, with the addition of water and desired additives, mashed to a slurry, and passed through a properly-operated finisher to produce a peel- and other debris-free slurry of about 18% essentially unicellular potato cells and the additives in water. This slurry is then foamed to a stable foam by various known methods and about 70% of the resulting foam is dried down to about 10% moisture on a drum drier and fed to a mixer where it is mixed with the balance of the undried foam to produce a fluffy, porous mashable damp powder of about 60% moisture. This damp powder is dried to about 30% moisture and by variation in the manner of holding, cooling, agitating, and drying down to about 7% moisture the bulk density and reconstitution characteristics of the final instant mashed potato product can be controllably varied from substantially that of potato granules to substantially that of potato flakes.

---

This invention relates to processes for the production of dry instant mashed potato products, and, more particularly, to a single-pass process in which a stable foamed potato slurry is produced and then dried either to produce a product in granular form which is comparable in reconstitution characteristics to conventional potato granules or an agglomerated product which has the reconstitution characteristics of conventional potato flakes.

Potato granules have been widely accepted and are being produced in large quantities in the United States and overseas. Although they are capable of being reconstituted to a mashed potato of excellent flavor and texture and can be reconstituted in boiling liquid and whipped without the creation of pastiness, there are certain built-in disadvantages, mainly in the process, which leave room for improvement. In order to obtain discrete potato cells in the dry form, it is necessary to add back large quantities of dried finished product during the process. This results in repeated exposure of the cells to mixing and drying equipment and multiplies the possibility of damage to the potato cells before they find their way out of the process. Since 80–90% of the end product is recycled, equipment must be necessarily oversized in relation to pounds of product packed. Furthermore, a possible hazard exists, because of the necessity of holding a damp potato product for an hour or more under conditions which, if not carefully controlled, could allow bacterial growth. Finally, in order to obtain the necessary cell separation, the soluble amylose fraction of the potato starch must be allowed to retrograde. This reduces the solubility of the starch and reduces the amount of water which the dried product is capable of absorbing in reconstitution to a mashed potato. This necessary retrogradation likewise reduces the ability of the product to reconstitute in cold water—an attribute desired by producers of mashed potato products which are to be frozen.

It is an object of this invention to produce dehydrated granular and agglomerated mashed potato products by a one-pass process.

It is a further object of this invention to produce granular and agglomerated dehydrated mashed potato products which absorb more liquid in reconstitution than potato granules and which can be reconstituted satisfactorily in water at lower temperatures.

It is a further object of this invention to produce granular and agglomerated dehydrated mashed potato products of controlled particle size and bulk densities in a wide range.

A flow sheet illustrating diagrammatically our processes and variations possible therein accompanies this specification.

The essential first step in our invention is to produce for foaming a damage-free and debris-free slurry of potato flesh, which consists essentially of water containing, for example, 18% substantially completely separated intact potato cells and the conventional additives. A preferred mode of producing such a slurry is described in detail in our co-pending application Ser. No. 222,538. Thus, potatoes are washed, peeled, cut if necessary, precooked, cooled and cooked in the conventional manner. The hot cooked potatoes are then premashed at a temperature of about 130–150° F. in the presence of liquid and additives such as BHT antioxidant, sulphite salts, monoglycerides and chelating agents. This mash, which is in the form of a lumpy slurry with about 12–18% potato solids, is then passed through an altered finisher operated at less than 100 r.p.m. and using a screen with about .023–.060″ perforations and a paddle clearance of about ¼″. This step removes any residual peel, eyes, fibers or other debris and discharges an undamaged, debris-free slurry consisting of more than 90% intact unicellular potato cells. The remainder consists of groups of two or three attached, undamaged cells.

Surprisingly, we have found that potato cells toughened by precooking and cooling prior to cooking can be foamed at about 18% solids without rupture of the cell walls. The foaming operation is performed, for example, in an Oakes Mixer which rapidly mixes the potato slurry containing additive emulsifiers in the presence of gas, thereby incorporating the gas into the slurry to form a stable foam with a density in the range of .4 to .8 gram per milliliter. The actual density is controllable and is dependent upon such factors as the amount and type of emulsifier used, the solids of the potato slurry, the temperature of the slurry, and the amount of gas introduced into the foaming unit. We prefer to use Myverol 18-07 [1] monoglyceride at a concentration by weight of about .5 to 1% of the weight of the potato solids. The production of stable foams of various food products is generally disclosed in the prior art, for example, in U.S. Patents Nos. 2,955,943; 2,967,109; 2,976,158; 2,981,629; 3,031,-313; and 3,093,488.

Other types of foaming equipment, of course, could be substituted for the Oakes Mixer which we used so long as the foam produced contained substantially only intact potato cells without production of inadmissible levels of free starch.

In one application of our invention, the stable foam is divided into two parts on roughly a 70–30 basis. This division is not critical but we prefer this approximate division for reasons which will be explained later. Seventy percent of the foam is sent directly to the nip of a conventional double drum dryer where it is evenly distributed and quickly dried to a moisture of about 10% at which time it is scraped form the rolls and introduced to a mixer. This intermediate has a snowflake-like appearance

[1] Trade name of a Distillation Products, Inc. monoglyceride commonly used in the industry.

and, although it is undamaged, the bulk density is so low that it is difficult to wet it with required reconstitution liquid to produce mashed potatoes. The balance of the stable foam—30%— is fed directly into the same mixer. Although the composite moisture content is about 60%, the mix is a fluffy, porous, and workable damp "powder" or granular mass, substantially the same in handling characteristics as the moist powder initially resulting in the conventional add back process. Its moisture level, however, is far above that which can be tolerated when mixing cooked potatoes with potato granules in the add back process. Early workers in the granule field found that a mix of 50% moisture was an absolute maximum and that 40% moisture mix was a practical maximum. By our foam-dried foam mix process, we have handled mixes as high as 65% with no operating problems.

The very damp mix is then fed into a primary dryer where the moisture content is reduced to about 30%. Any dryer which does not damage the product is satisfactory for this step. We prefer to stop the primary drying at the 30% moisture level since this is the level at which retrogradation of amylose is reported to be most rapid. We immediately cool the 30% mix to about room temperature to further encourage its transition to a mealy texture. The cooled mix is then introduced into a mixer to equilibrate as an aid in granulation, after which the equilibrated mix can be fed onto a holding belt if further retrogradation or a finely granulated end product is desired. The retrograded 30% mix can then again be mixed to promote finer granulation and screened to the desired size. Oversized agglomerates can be broken down to the desired size without damage, but we prefer to return this small fraction to the first mixer following the primary dryer. The fine fraction from the screening is then fed into a second dryer where the moisture content is reduced to about 7%. After cooling, the fully dry product is given a final screening. Dried agglomerates which fail to pass the desired screen are now returned to the primary mixer in which the foam is introduced.

The following table shows the density and rehydration characteristics of granular and agglomerated products as produced by our process as compared to present commercial products:

| Fraction (U.S. mesh) | Bulk density, grams/ml. | Reconstitution time in 200° F. water | Ratio liquid to dry product |
|---|---|---|---|
| −14 +20 | .55–.65 | 90 seconds | 5.4:1 |
| −20 +32 | 0.6–0.7 | 30 seconds | 5.3:1 |
| −32 | 0.7–0.8 | 20 seconds | 5.2:1 |
| −80 | 0.85 | Immediate | 5.1:1 |
| Potato flakes | 0.35 | 30 seconds | 5.3:1 |
| Potato granules | 0.90 | Immediate | 5.0:1 |

The process as outlined has extreme flexibility. If large agglomerates are desired, initial cooling and subsequent holding and mixing steps with the 30% mix can be eliminated. Such a process produces a product with increased water absorption ability and with the attribute of rehydration in cold water. If a fine end product consisting of many single cells is desired, all the cooling, mixing and holding steps are utilized. This allows complete amylose retrogradation and results in a product comparable to conventional potato granules, but with a bulk density in the range of .7 gram per milliliter. Another advantage of the flexibility is the ability to vary the process to suit the type of potatoes available for processing. For example, a weak-celled potato normally unsuitable for a conventional potato flake or potato granule process, can be satisfactorily processed by using extra emulsifier with such longer or cooler holding steps in addition as may be found necessary to form a mealy product. We have found this flexibility advantageous in the case of California White Rose, Red River Norland, and some Maine potatoes.

In another application of our process, milk can be added without formation of the "processed" flavor which results when milk is dried on atmospheric drum dryers. To accomplish this, the damage-free, debris-free slurry is divided into two fractions each of which goes to separate foaming equipment. All of the milk component is fed into the foamer which discharges directly to the first mixer. The milk is therefore never subjected to the high drum dryer temperatures which cause solubility and flavor alterations. Since this is a "one-pass" process, the milk is not subjected to repeated wetting and drying as it would necessarily be if incorporated into a standard add back granule process. Present potato granule-milk products are necessarily mechanical mixtures of dry ingredients to avoid this problem.

The accompanying flow sheet illustrates diagrammatically what we have just described. On this sheet optional variations are shown in dotted lines. The solid line shows the preferred process for producing potato granules. The dotted lines (other than the milk addition showing) illustrate how retrogradation can be progressively reduced and as fully reduced lead to an agglomerated product having the reconstitution characteristics of potato flakes. It will be understood that if the milk addition option is used, the milk containing foam replaces the 30% portion of the total foam shown going to the primary mixer in the proper proportion to produce the desired moisture content of the output of that mixer.

We claim:
1. A single pass process for the production of a dry instant mashed potato product comprising the steps of producing a stable wet foam from a damage-free, debris-free potato slurry, drying a major fraction of said wet foam to a dry foam, intimately mixing said dry foam with the balance of the wet foam, and drying the resulting very damp granular mix.
2. The process of claim 1 in which the very damp granular mix is first predried to about 30% moisture, granulated, substantially retrograded, and then final dried.
3. The process of claim 1 in which the very damp granular mix is first predried to about 30% moisture, remixed, and final dried without substantial retrogradation.
4. The process of claim 1 in which the portion of the foam which is mixed with the dry foam contains milk solids.

References Cited
UNITED STATES PATENTS 3,031,313   4/1962   Morgan et al. _____ 99—207 X
3,085,019   4/1963   Kueneman et al. _____ 99—207
3,275,458   9/1966   Willard _____ 99—207

OTHER REFERENCES

Van Arsdel et al.: Food Dehydration, vol. 2, Avi Publ. Co., Westport, Conn. 1964, p. 346.

LIONEL M. SHAPIRO, Primary Examiner

D. M. NAFF, Assistant Examiner